(12) United States Patent
Kohno et al.

(10) Patent No.: US 7,452,300 B2
(45) Date of Patent: Nov. 18, 2008

(54) ROTARY-SHAFT SUPPORT DEVICE

(75) Inventors: Tetsuya Kohno, Okazaki (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 133 days.

(21) Appl. No.: 11/222,868

(22) Filed: Sep. 12, 2005

(65) Prior Publication Data
US 2006/0084546 A1 Apr. 20, 2006

(30) Foreign Application Priority Data
Sep. 14, 2004 (JP) .............................. 2004-266292

(51) Int. Cl.
*F16H 57/04* (2006.01)
(52) U.S. Cl. ...................................................... 475/160
(58) Field of Classification Search .................. 475/160
See application file for complete search history.

(56) References Cited

U.S. PATENT DOCUMENTS

| | | | | |
|---|---|---|---|---|
| 4,183,263 A | * | 1/1980 | Osenbaugh | ............... 74/606 R |
| 4,560,056 A | * | 12/1985 | Stockton | ................. 192/113.32 |
| 5,890,984 A | | 4/1999 | Teraoka et al. | |
| 6,059,683 A | * | 5/2000 | Teraoka et al. | ............... 475/160 |
| 6,837,821 B2 | * | 1/2005 | Teraoka et al. | ............... 475/231 |
| 2003/0232683 A1 | | 12/2003 | Teraoka et al. | |

FOREIGN PATENT DOCUMENTS

| | | | |
|---|---|---|---|
| JP | 04321863 A | * | 11/1992 |
| JP | 08-170717 | | 7/1996 |
| JP | 8-170718 | | 7/1996 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

A rotary-shaft support device including a casing having an inner circumferential surface defining a shaft hole in which an output shaft is rotatably fitted, the inner circumferential surface having a generally helical lubrication groove having a non-helical inlet end portion which is formed in an open end portion of said shaft hole and which is parallel to a plane perpendicular to an axis of said shaft hole.

8 Claims, 6 Drawing Sheets

ROTARY-SHAFT SUPPORT DEVICE

The present application is based on Japanese Patent Application No. 2004-266292 filed on Sep. 14, 2004, the contents of which are herein incorporated by reference.

BACKGROUND OF THE INVENTION

1. Field of the Invention

The present invention relates in general to a rotary-shaft support device constructed to rotatably support a rotary shaft, such as a differential device having a differential casing which rotatably supports right and left output shafts and which is arranged to transmit an input torque to the right and left output shafts. More particularly, the present invention is concerned with lubrication grooves formed to feed a lubricant to mating surfaces of the rotary shaft and a shaft hole in which the rotary shaft is rotatably supported.

2. Discussion of the Related Art

An example of a known rotary-shaft support device constructed to rotatably support a rotary shaft is a differential device including a differential casing which rotatably supports right and left output shafts, right and left side gears coaxial with the output shafts, and a pair of pinion gears meshing with the side gears. The differential device is arranged to distribute an input torque to the right and left side gears. The differential casing has shaft holes in which the output shafts are rotatably fitted. Usually, lubrication grooves to be supplied with a lubricant are formed in the inner circumferential surfaces of the shaft holes.

JP-8-170718A discloses in FIG. 1 an example of helical lubrication grooves. The helical configuration of the lubrication holes is advantageous in that the helical configuration permits flows of the lubricant in the axial direction of the differential casing. For this advantage, the lubrication grooves of helical configuration are widely used.

A recent tendency of use of a lubricant having a high degree of viscosity requires an improvement in the lubricating efficiency of a rotary-shaft support device using such a highly viscous lubricant.

SUMMARY OF THE INVENTION

The present invention was made in the light of the background art discussed above. It is therefore an object of the present invention to provide a rotary-shaft support device which is improved in its lubricating efficiency.

The objected indicated above may be achieved according to the principle of the present invention, which provides a rotary-shaft support device including a casing having an inner circumferential surface defining a shaft hole in which an output shaft is rotatably fitted, the inner circumferential surface having a generally helical lubrication groove having a non-helical inlet end portion which is formed in an open end portion of the shaft hole and which is parallel to a plane perpendicular an axis of said shaft hole.

In the rotary-shaft support device of the present invention constructed as described above, the inlet end portion of the generally helical lubrication groove formed in the outer open end portion of the shaft hole is not formed helically but is formed parallel to the radial direction of the shaft hole, along the edge of the open end of the shaft hole. Accordingly, the inlet end portion of the generally helical lubrication groove has a relatively large cross sectional area taken in a plane which is perpendicular to the axis of the corresponding shaft hole and which includes the inlet open end of the shaft hole, so that a relatively large amount of a lubricant can be introduced into the generally helical lubrication groove, making it possible to improve the lubricating efficiency of the rotary-shaft support device, without a significant increase of a cost of manufacture of the rotary-shaft support device, by mere modification of the configuration of the inlet end portion of the lubrication groove.

The rotary-shaft support device of the present invention is preferably used as a differential device which is arranged to transmit a torque to right and left drive wheels or front and rear drive wheels of an automotive vehicle, so as to absorb a speed difference of those drive wheels. Namely, the casing of the rotary-shaft support device of this invention may be a differential casing having a pair of shaft holes in which respective two output shafts to be operatively connected to respective drive wheels of an automotive vehicle are rotatably fitted. The differential casing further has a chamber for accommodating a pair of rotatably supported side gears coaxial with the two output shafts, and a plurality of rotatably supported pinion gears meshing with the pair of side gears. In this differential casing, the generally helical lubrication groove is formed in an inner circumferential surface which defines each of said pair of shaft holes The pinion gears may be of various types, such as helical pinion gears as disclosed in the above-identified publication JP-8-170718A, or a plurality of pairs of pinion gears. However, the rotary-shaft support device of this invention is not limited to the differential device, and the rotary-shaft support device in the form of the differential device may be of any type, such as a limited slip differential (LSD) type.

The substantially helical lubrication groove formed in the inner circumferential surface of the shaft hole of the casing may be helically formed as desired, except the non-helical inlet end portion, as long as the helical portion of the lubrication groove permits a flow of the lubricant, generally in the axial direction of the shaft hole. The helical portion need not have a constant lead or pitch in the axial direction of the shaft hole.

The casing of the present rotary-shaft support device may be manufactured by casting, forcing or any other suitable forming methods. The lubrication groove may be formed by a machining operation after the manufacture of the casing, or formed in the process of manufacture, for example, in a casing operation to produce the casing. In the latter case, the rotary-shaft support device is available at a lower cost than in the former case.

Where the generally helical lubrication groove is formed in the process of a casting operation to produce the casing by using a core, the generally helical lubrication groove preferably further has a plurality of non-helical intermediate portions which are formed so as to extend in parallel to the plane perpendicular to the axis of the shaft hole. These non-helical intermediate portions are formed at two diametrically opposite circumferential positions of the inner circumferential surface of the shaft hole at which a circumference of the inner circumferential surface intersects a first reference plane which includes the axis of the shaft hole. In this case, each of the plurality of non-helical intermediate portions has a deep straight part which has a larger depth than other parts of the generally helical lubrication groove, and a straight bottom which is parallel to a second reference plane which is parallel to the axis of said shaft hole and perpendicular to the first reference plane. Where the generally helical lubrication groove has the above-described non-helical intermediate portions, the core used for casting of the casing of the rotary-shaft support device has a generally helical projection which corresponds to the generally helical lubrication groove and which has non-helical intermediate portions corresponding to those of the generally helical lubrication groove. Where the core is produced by casting using a pair of dies, these dies are butted together at a parting plane corresponding to a plane which includes the axis of the shaft hole of the casing. When the dies are removed from the core which has been formed by casting in the dies, the dies are moved apart from in the direction perpendicular to the parting plane. Since the generally helical projection formed on the core has the non-helical intermediate portions, the dies will not interference with the helical projection of the cast core when the dies are moved apart from the dies. Thus, the core used for casting the casing of the rotary-shaft support device can be cast with high stability, without damaging any portion of the helical projection, so that the generally helical lubrication groove can be formed as desired, by using the core.

BRIEF DESCRIPTION OF THE DRAWINGS

The above and other objects, features, advantages and technical and industrial significance of the present invention will be better understood by reading the following detailed description of a preferred embodiment of this invention, when considered in connection with the accompanying drawings, in which:

FIG. 5 is a cross sectional view taken along line 5-5 of FIG. 4; and.

DESCRIPTION OF THE PREFERRED EMBODIMENT

Figure 1:
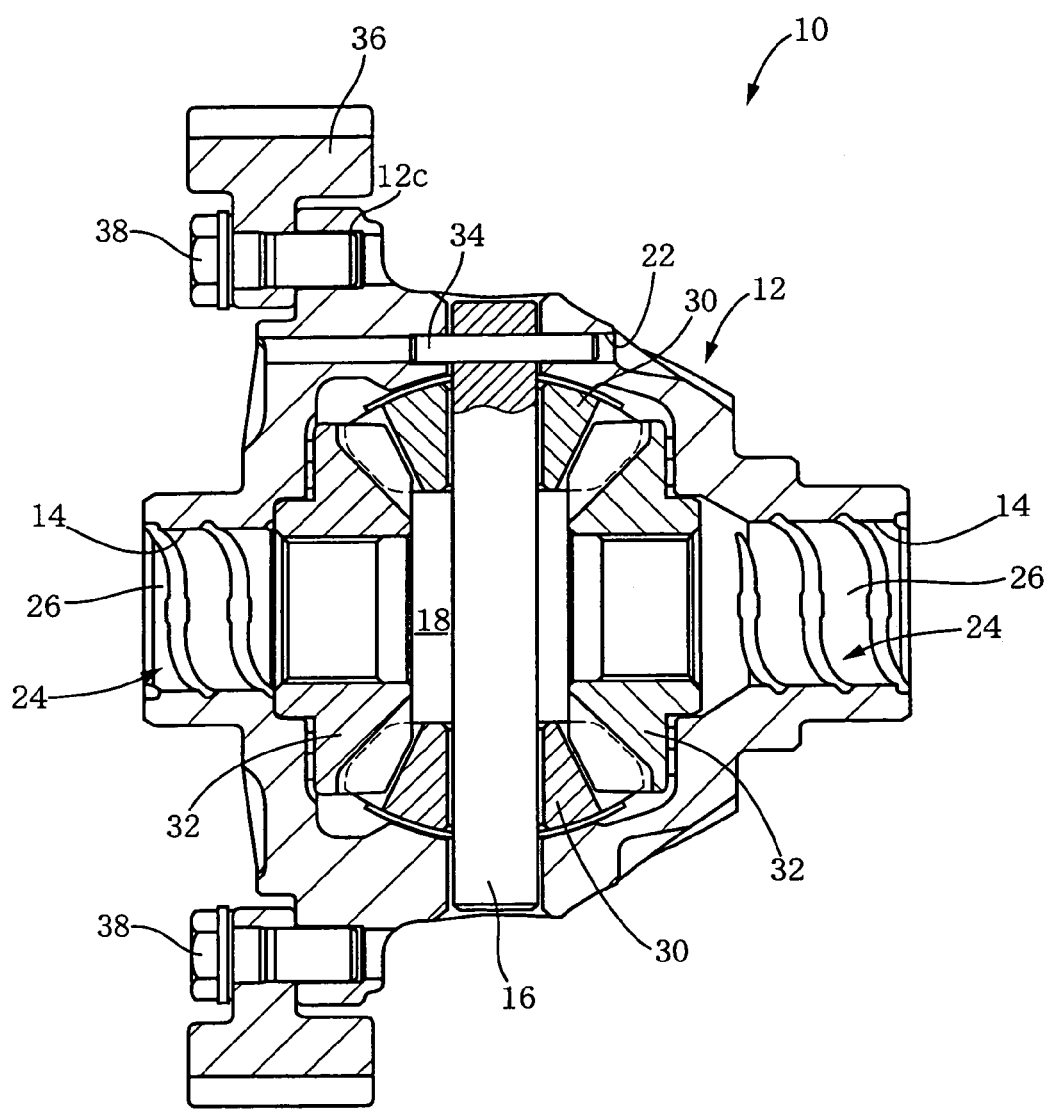
FIG. 1 is a cross sectional view of a differential device according to one embodiment of the present invention, taken in a plane including an axis of shaft holes and an axis of a pinion-gear shaft of a differential casing of the differential device.

In the cross sectional view of FIG. 1, reference numeral 10 denotes a rotary-shaft support device in the form of a differential device 10 which is constructed according to one embodiment of this invention and which includes a differential casing 12. Referring further to the cross sectional view of FIGS. 2 and 3, the differential casing 12 will be described. The differential casing 12 has a main body portion 12a of box construction, and a pair of cylindrical portions 12b extending from respective opposite ends of the main body portion 12a. The two cylindrical portions 12b are formed coaxially with each other, and have respective shaft holes 14. The differential casing 12 further has a flange portion 12c extending outwardly from the main body portion 12a in the radial direction of the shaft holes 14.

The main body portion 12a of the differential casing 12 has a central chamber 18 for accommodating a pinion-gear shaft 16, a pair of pinion gears 30 and a pair of side gears 32, which will be described. The central chamber 18 communicates with the shaft holes 14. The main body portion 12a further has a pair of outer through-holes 20 communicating with the central chamber 18. The two outer through-holes 20 are coaxial with each other, and have an axis perpendicular to the axis of the shaft holes 14. The main body portion 12a further has a pin hole 22 which has an axis perpendicular to the axis of the outer through-holes 20, that is, parallel to the axis of the shaft holes 14.

Two output shafts (not shown) are fitted in the respective two shaft holes 14 such that the two output shafts are rotatable relative to the differential casing 12. In the inner circumferential surface defining the two shaft holes 14, there are formed respective two generally helical lubrication grooves 24 such that each generally helical lubrication groove 24 helically extends about an axis of the corresponding shaft hole 14 from an outer open end of the shaft hole 14 toward an inner open end of the shaft hole 14 on the side of the central chamber 18. When each output shaft is rotated relative to the differential casing 12, a lubricant (lubrication oil) introduced into the corresponding helical lubrication groove 24 through its inlet at the outer open end of the shaft hole 14 is fed through the helical lubrication groove 24, generally in the axial direction toward an inner open end of the shaft hole 14, namely, toward the central chamber 18.

Figure 2:
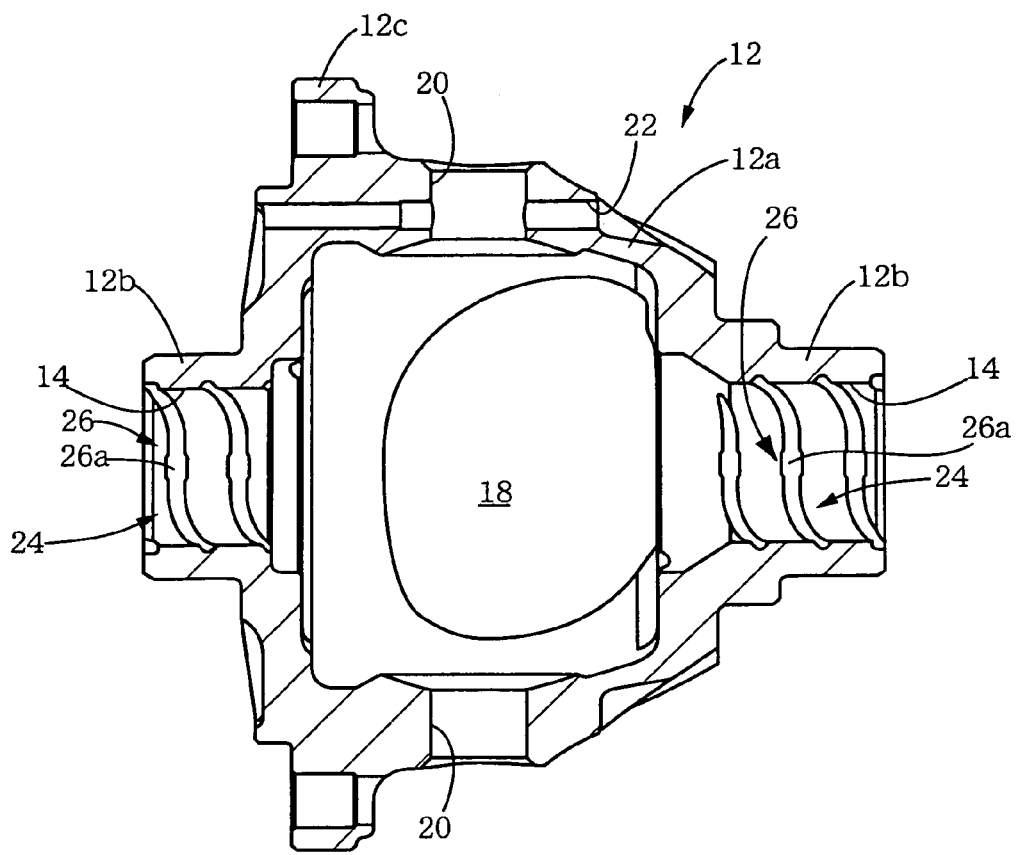
FIG. 2 is a cross sectional view of the differential casing, taken in the plane of FIG. 1.
Figure 3:
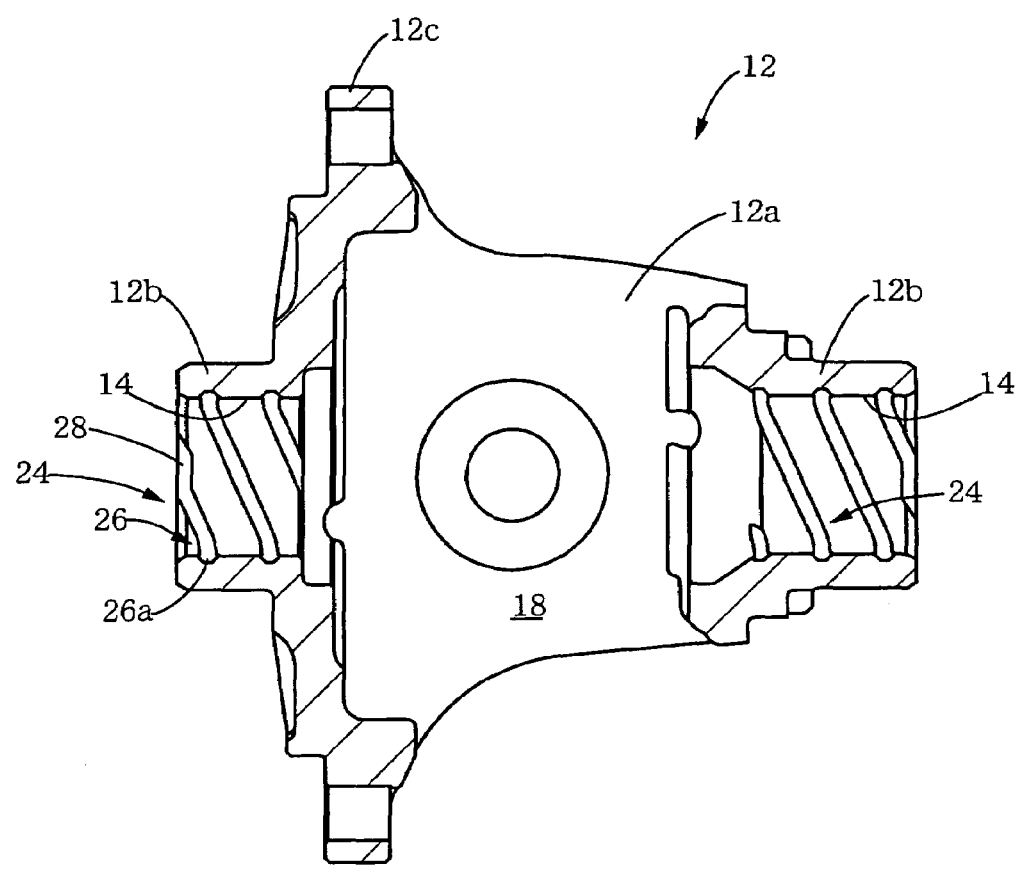
FIG. 3 is a cross sectional view of the differential casing, taken in a plane which includes the axis of the shaft holes and which is perpendicular to the plane of FIG. 1.
Figure 5:
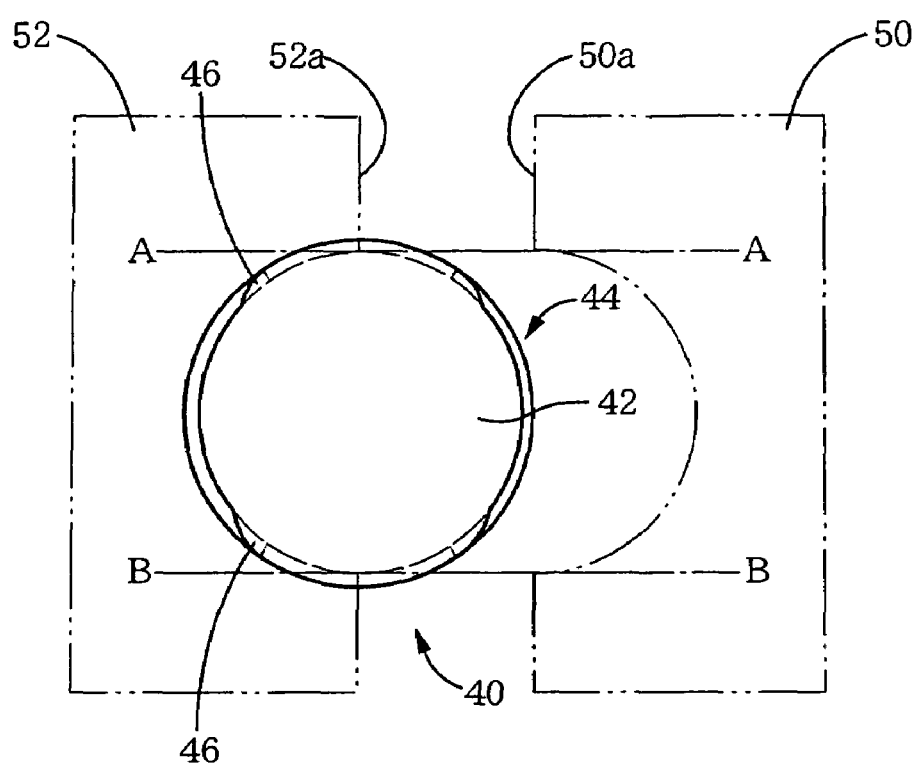

Each generally helical lubrication groove 24 has a plurality of non-helical intermediate portions 26 formed at two circumferential positions of the inner circumferential surface of the shaft hole 14 which are opposite to each other in a diametric direction of the shaft hole 14 which is perpendicular to the diametric direction in which the outer through-holes 20 are opposed to each other, as shown in FIGS. 1-3. Namely, the cross sectional plane of FIG. 3 which includes the axis of the shaft holes 14 is perpendicular to the cross sectional plane of FIGS. 1 and 2 which includes the axis of the shaft holes 14 and the axis of the pinion-gear shaft 16 (axis of the outer through-holes 20. The two circumferential positions of the shaft hole 14 are the positions at which the circumference of the shaft holes 14 intersects a first reference plane which is the cross sectional plane of FIG. 3. The non-helical intermediate portions 26 of the generally helical lubrication grooves 24 are formed so as to extend in parallel to a plane which is perpendicular to the axis of the shaft holes 14. Each of the non-helical intermediate portions 26 includes a deep wide straight part 26a which is larger depth and width than the other parts of the helical lubrication groove 24. The deep wide straight part 26a has a straight bottom which is parallel to a second reference plane which is parallel to the axis of the shaft hole 14 and perpendicular to the cross sectional plane of FIG. 3. This second reference plane corresponds to straight line A-A and straight line B-B which are shown in FIG. 5 and which will be described with respect to a process of manufacture of the differential casing 12.

Figure 6:
FIG. 6 is a view showing a lubrication groove formed in a conventional differential casing.

Each generally helical lubrication groove 24 further has a non-helical inlet end portion 28 formed in the outer open end portion of the corresponding shaft hole 14 such that the non-helical inlet end portion 28 is parallel to a plane perpendicular to the axis of the shaft hole 14, that is, parallel to the non-helical intermediate portions 26. In the presence of this non-helical inlet end portion 28, the generally helical lubrication groove 24 has a significant larger cross sectional area than a conventional helical lubrication groove 54 shown in FIG. 6, so that a sufficiently large amount of lubricant can be introduced into the generally helical lubrication groove 24 through its non-helical inlet end portion 28.

Referring back to FIG. 1, the pinion-gear shaft 16 supported in the differential casing 12 of the differential device 10 rotatably supports a pair of pinion gears 30 accommodated in the central chamber 18 formed in the differential casing 12. The central chamber 18 also accommodates a pair of side gears 32 which are coaxial with each other and the shaft holes 14 and which mesh with the pair of pinion gears 30.

In the pin hole 22 formed in the differential casing 12, there is inserted a retainer pin 34 such that the retainer pin 34 extends through the pinion-gear shaft 16 in its diametric direction, for thereby preventing an axial movement of the pinion-gear shaft 16. A ring gear 16 is disposed coaxially with the side gear 32 and fixed at its radially inner portion to the flange portion 12c by screws 38 such that the inner portion of the ring gear 16 is held in abutting contact with an annular surface (left side surface as seen in FIG. 1) of the flange portion 12c. Accordingly, the differential casing 12 is rotated about the axis of the side gears 32, together with the ring gear 36. When the differential casing 12 is rotated about the axis of the side gears 32, a rotary motion of the differential casing 12 is distributed to the two side gears 32 via the pinion gears 30.

Figure 4:
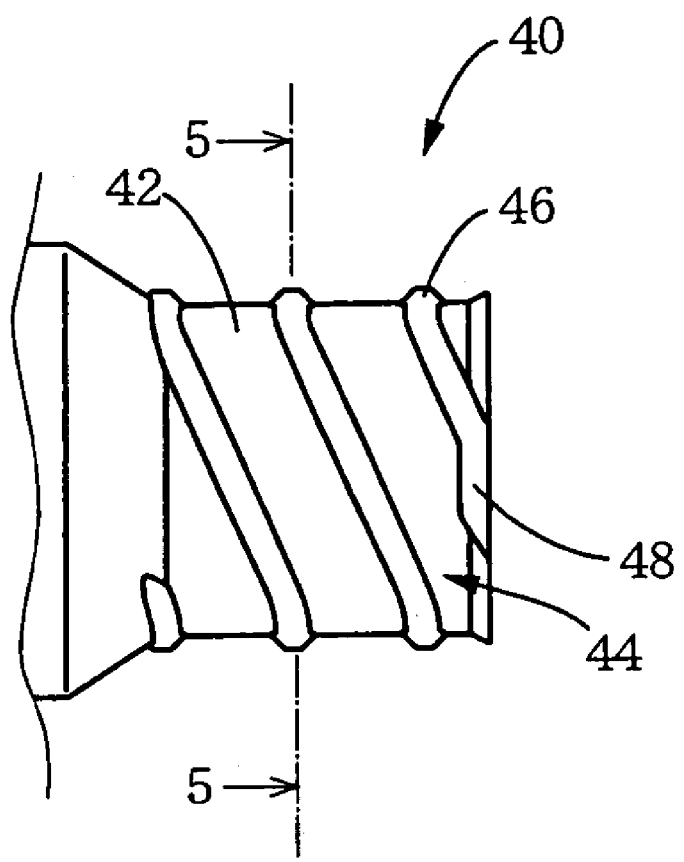
FIG. 4 is a fragmentary view showing a core used to cast the differential casing of FIGS. 2 and 3.

Referring next to FIG. 4, there is shown a part of a core 40 which is used to produce the differential casing 12 by a casting operation. The core 40 includes a pair of shaft portion2 42 for forming the shaft holes 14 having the generally helical lubrication grooves 24. As shown in FIG. 4, each of the shaft portions 42 has a generally helical projection 44 formed on its outer circumferential surface, for forming the generally helical lubrication grooves 24 of the differential casing 12. This generally helical projection 44 has a plurality of non-helical intermediate portions 46 for forming the plurality of non-helical intermediate portions 26 of the lubrication groove 24, and a non-helical end portion 48 which is formed in an end portion of the shaft portion 42, to form the non-helical inlet end portion 28 of the lubrication groove 24. The non-helical intermediate portions 46 are formed at two diametrically opposed circumferential positions of the outer circumferential surface of the shaft portion 42 at which the circumference of the outer circumferential surface intersects a plane which includes the axis of the shaft portion 42.

Referring further to the cross sectional view of FIG. 5 taken along line 5-5 of FIG. 4, there is shown a pair of dies 50, 52 (indicated by two-dot chain lines) which are used to cast the core 40 (which is used to cast the differential casing 12). For casting the core 40, the two dies 50, 52 are butted together at their abutting surfaces 50a, 50b. In the state of FIG. 5, the die 52 is in contact with the core 40 which has been cast, while the core 50 has been released from the cast core 40 in a direction perpendicular to the mutually abutting surfaces 50a, 52a of the two dies 50, 52. These abutting surfaces 50a, 52a define a parting plane of the two dies 50, 52. These dies 50, 52 have holes and grooves that are respectively identical with the shaft holes 14 and the generally helical lubrication grooves 24.

The above-described straight line A-A and straight line B-B in FIG. 5 are perpendicular to the abutting surfaces 50a, 52a, and are tangent with the circumference of the outer circumferential surface of the shaft portion 42. The non-helical intermediate portions 46 of the generally helical projection 44 are entirely located above the straight line A-A or below the straight line B-B, as seen in the plane of FIG. 5. More precisely, the non-helical intermediate portions 46 are located outwards of the planes respectively including the straight lines A-A and B-B and perpendicular to the plane of FIG. 5, as viewed in the radial direction of the core 40. It is noted that a plane including the abutting surface 52a as shown in FIG. 5 corresponds to the cross sectional plane of FIG. 3, and that the above-described planes respectively including the straight lines A-A and B-B correspond to planes which are perpendicular to the cross sectional plane of FIG. 3 and which respectively include two straight lines of intersection between the cross sectional plane of FIG. 3 and the circumference of the inner circumferential surface of the shaft holes 14. Accordingly, each of the generally helical lubrication grooves 24 formed in the differential casing 12 produced by casting using the core 40 has the plurality of non-helical intermediate portions 26 which are formed so as to extend in parallel to a plane perpendicular to the axis of the shaft holes 14 (namely, in parallel to a plane perpendicular to the cross sectional plane of FIG. 3), and at the two circumferential positions of the shaft holes 14 at which the circumference of the shaft holes 14 intersects the cross sectional plane of FIG. 3.

The helical projection 44 and the dies 50, 52 may interfere with each other at the portions of the helical projection 44 which are located above the plane including the straight line A-A, and below the plane including the straight line B-B, as seen in FIG. 5. However, these portions of the helical projection 44 are formed as the non-helical intermediate portions 46 corresponding to the non-helical intermediate portions 26 which have the respective deep wide straight parts 26a. That is, the non-helical intermediate portions 46 are parallel to a plane perpendicular to the axis of the shaft portion 42 of the core 40, namely, parallel to the plane of FIG. 5. Therefore, the non-helical intermediate portions 46 of the helical projection 44 do not interfere with the dies 50, 52 when the die 50 is removed from the core 40 by moving the die 50 rightwards in the direction perpendicular to the abutting surface 50a, or when the die 52 is removed from the core 40 by moving the die 52 leftwards in the direction perpendicular to the abutting surface 52a, as seen in FIG. 5. In other words, the core 40 formed by casting using the dies 50, 52 can be released from the dies 50, 52, without an interference between the helical projection 44 and the dies 50, 52, so that the non-helical lubrication grooves 24 can be formed in the inner circumferential surface of the shaft holes 14, in the process of casing of the differential casing 12 by using the core 40.

As described above, the differential casing 12 of the differential device 10 constructed according to the illustrated embodiment of this invention has the generally helical lubrication grooves 24 each having the non-helical inlet end portion 28 which is formed in the open end portion of the corresponding shaft hole 14 and which is parallel to a plane perpendicular to the axis of the shaft hole 14. This non-helical inlet end portion 28 has a sufficiently large cross sectional area taken in a plane which is perpendicular to the axis of the shaft hole and which includes the inlet open end of the shaft hole, so that a relatively large amount of a lubricant can be introduced into the generally helical lubrication groove, making it possible to improve the lubricating efficiency of the rotary-shaft support device, without a significant increase of a cost of manufacture of the rotary-shaft support device, by mere modification of the configuration of the inlet end portion of the lubrication groove.

In the illustrated embodiment, the generally helical projection 44 formed on the core 40 used to cast the differential casing 12 has the non-helical end portion 48 corresponding to the non-helical inlet end portion 28 of the generally helical lubrication groove 24, so that the generally helical lubrication grooves 24 each having the non-helical inlet end portion 28 can be formed in the process of casting of the differential casing 12 using the core 40. Thus, the use of the core 40 to cast the differential casing 12 permits a sufficiently large cross sectional area of the inlet open end 28 of each generally helical lubrication groove 24.

While the preferred embodiment of this invention has been described in detail by reference to the accompanying drawings, for illustrative purpose only, it is to be understood that the present invention is not limited to the details of the preferred embodiment, but may be embodied with various changes, modifications and improvements which may occur to those skilled in the art, in the light of the foregoing teachings.

What is claimed is:

1. A rotary-shaft support device, comprising:
a casing having an inner circumferential surface defining a shaft hole in which an output shaft is rotatably fitted, wherein said inner circumferential surface includes a generally helical lubrication groove having a non-helical inlet end portion which is formed on the inner circumferential surface and along only a part of an open end portion of said shaft hole and which is parallel to a plane perpendicular to an axis of said shaft hole.

2. The rotary-shaft support device according to claim 1, wherein said casing is a differential casing having a pair of shaft holes in which respective two output shafts to be operatively connected to respective drive wheels of an automotive vehicle are rotatably fitted, said differential casing further having a chamber for accommodating a pair of rotatably supported side gears coaxial with said two output shafts, and a plurality of rotatably supported pinion gears meshing with said pair of side gears, said generally helical lubrication groove being formed in an inner circumferential surface which defines each of said pair of shaft holes.

3. The rotary-shaft support device according to claim 1, wherein said generally helical lubrication groove further has a plurality of non-helical intermediate portions which are formed so as to extend in parallel to said plane perpendicular to the axis of the shaft hole, said plurality of non-helical intermediate portions being formed at two diametrically opposite circumferential positions of the inner circumferential surface of said shaft hole at which a circumference of said inner circumferential surface intersects a first reference plane which includes the axis of the shaft hole.

4. The rotary-shaft support device according to claim 3, wherein each of said plurality of non-helical intermediate portions has a deep straight part which has a larger depth than other parts of said generally helical lubrication groove, and a straight bottom which is parallel to a second reference plane which is parallel to the axis of said shaft hole and perpendicular to said first reference plane.

5. The rotary-shaft support device according to claim 4, wherein said deep straight part has a larger width than said other parts of said generally helical lubrication groove.

6. The rotary-shaft support device according to claim 1, wherein said casing is produced by casting using a core including a shaft portion having a generally helical projection formed on an outer circumferential surface thereof to form said generally helical lubrication groove, said generally helical projection having a non-helical end portion formed in an end portion of said shaft portion to form said non-helical inlet end portion of said generally helical lubrication groove.

7. The rotary-shaft support device according to claim 3, wherein said casing is produced by casting using a core including a shaft portion having a generally helical projection formed on an outer circumferential surface thereof to form said generally helical lubrication groove, said generally helical projection having a plurality of non-helical intermediate portions which are formed so as to extend in parallel to a plane perpendicular to an axis of said shaft portion, to form said plurality of non-helical intermediate portions of said generally helical lubrication groove, said plurality of non-helical intermediate portions of said generally helical projection being formed at two diametrically opposite circumferential portions of said outer circumferential surface of said shaft portion at which a circumference of said outer circumferential surface intersects a plane which includes the axis of the shaft portion.

8. The rotary-shaft support device according to claim 1, wherein a cross-sectional area of the groove at the non-helical inlet end portion is larger than the cross-sectional area of the groove immediately adjacent the inlet end portion.

* * * * *